United States Patent
Tsuda et al.

(10) Patent No.: US 9,619,873 B2
(45) Date of Patent: Apr. 11, 2017

(54) IMAGE PROCESSING DEVICE AND IMAGE PROCESSING METHOD

(71) Applicant: MITSUBISHI ELECTRIC CORPORATION, Tokyo (JP)

(72) Inventors: Yuka Tsuda, Tokyo (JP); Nobuhiko Yamagishi, Tokyo (JP); Toshiyuki Shimizu, Tokyo (JP); Takashi Hatakenaka, Tokyo (JP); Junko Shinohara, Tokyo (JP); Hironobu Yasui, Tokyo (JP); Tomonori Fukuta, Tokyo (JP); Isao Otsuka, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 14/427,288

(22) PCT Filed: Oct. 21, 2013

(86) PCT No.: PCT/JP2013/006206
§ 371 (c)(1),
(2) Date: Mar. 10, 2015

(87) PCT Pub. No.: WO2014/064916
PCT Pub. Date: May 1, 2014

(65) Prior Publication Data
US 2015/0332444 A1    Nov. 19, 2015

(30) Foreign Application Priority Data

Oct. 25, 2012  (JP) .................................. 2012-235860

(51) Int. Cl.
*G06K 9/00* (2006.01)
*G06T 5/40* (2006.01)
(Continued)

(52) U.S. Cl.
CPC ................ *G06T 5/40* (2013.01); *G06T 5/008* (2013.01); *G06T 7/408* (2013.01); *H04N 1/407* (2013.01); *G06T 2207/10024* (2013.01)

(58) Field of Classification Search
USPC ..... 382/168, 167, 165, 162, 275; 348/222.1, 348/234; 358/522, 524; 399/9, 79
See application file for complete search history.

(56) References Cited

U.S. PATENT DOCUMENTS 5,222,154 A * 6/1993 Graham .................. G06T 7/408
358/522
6,064,838 A * 5/2000 Maruta .................. G03G 21/02
399/79

(Continued)

FOREIGN PATENT DOCUMENTS

JP          4-248681 A     9/1992
JP         10-271524 A    10/1998

(Continued)

*Primary Examiner* — Anh Do
(74) *Attorney, Agent, or Firm* — Birch, Stewart, Kolasch & Birch, LLP

(57) ABSTRACT

An image processing device includes: a calculator that calculates a gray scale histogram for each color component of an image signal; a calculator that calculates, for each color component, a maximum and a minimum of classes having a frequency greater than zero in the gray scale histogram; a determiner that generates, for each color component, a histogram having classes each having an absolute difference value between the frequencies of adjacent classes in the gray scale histogram, and compares the absolute difference values in the histograms with a value to determine, from the presence or absence of an absolute difference value exceeding the value, an image type of the image; a generator that generates a gray scale correction curve from the calculated maximum and minimum for each color component; and a corrector that performs gray scale correction on the image signal using the gray scale correction curve.

20 Claims, 8 Drawing Sheets

(51) Int. Cl.
*G06T 7/40* (2017.01)
*H04N 1/407* (2006.01)
*G06T 5/00* (2006.01)

(56) References Cited

U.S. PATENT DOCUMENTS

| | | | |
|---|---|---|---|
| 6,151,410 A | 11/2000 | Kuwata et al. | |
| 6,516,157 B1 * | 2/2003 | Maruta | G03G 21/02 399/79 |
| 7,986,351 B2 * | 7/2011 | Jiang | G06T 5/009 348/222.1 |
| 8,295,593 B2 * | 10/2012 | Lukac | G06K 9/0061 382/165 |
| 2009/0052774 A1 | 2/2009 | Yoshii et al. | |

FOREIGN PATENT DOCUMENTS

| | | |
|---|---|---|
| JP | 2000-32287 A | 1/2000 |
| JP | 2000-222564 A | 8/2000 |
| JP | 2003-51947 A | 2/2003 |
| JP | 2006-128986 A | 5/2006 |
| JP | 2009-253322 A | 10/2009 |
| JP | 2009-301090 A | 12/2009 |
| JP | 4447035 B2 | 4/2010 |
| JP | 2010-232795 A | 10/2010 |
| WO | WO 2006/103835 A1 | 10/2006 |

* cited by examiner

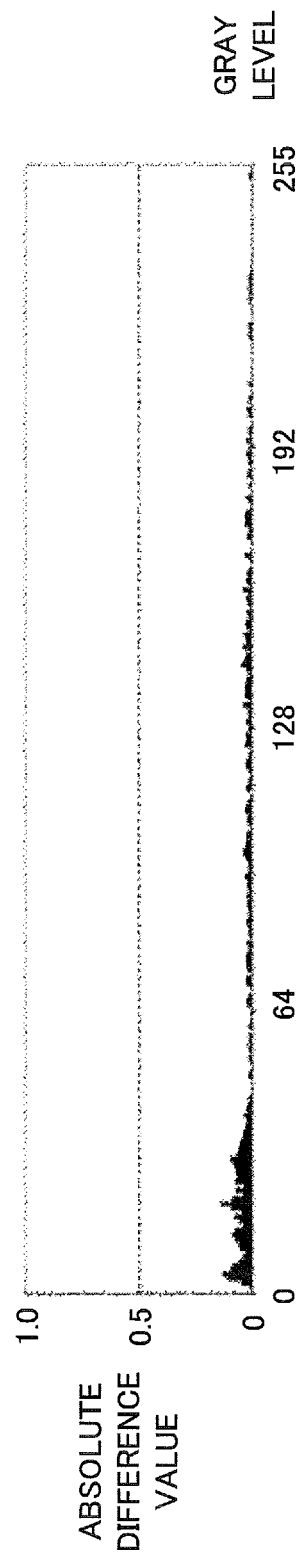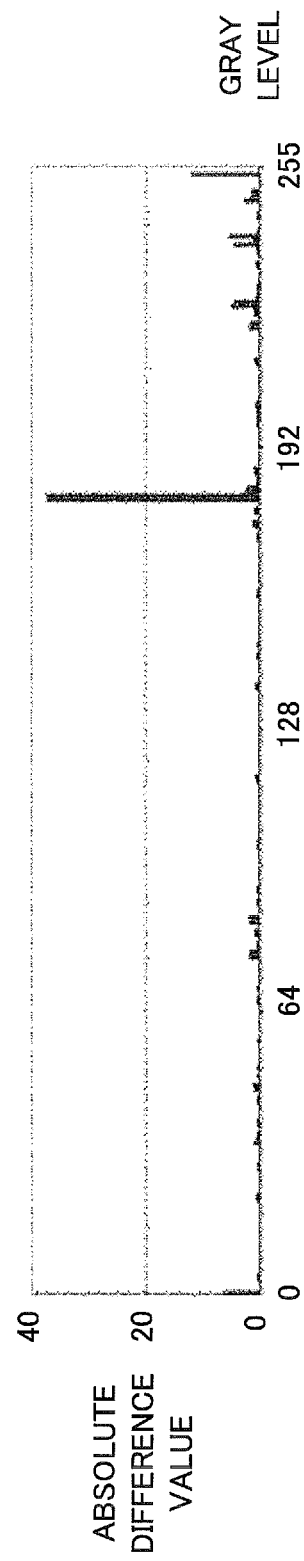

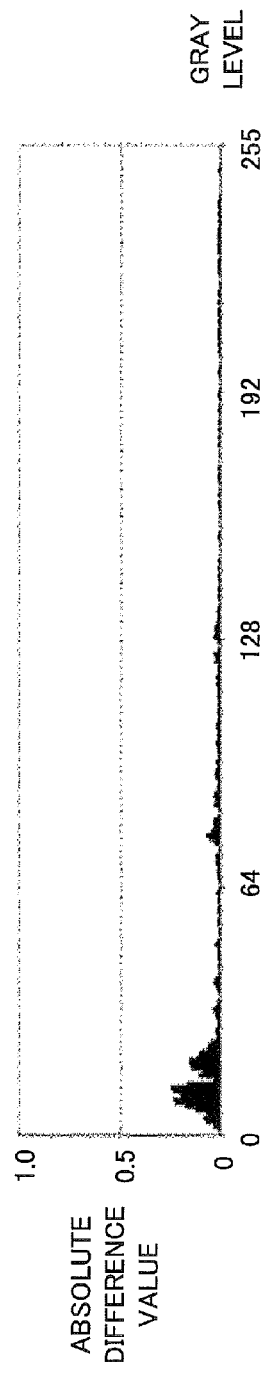
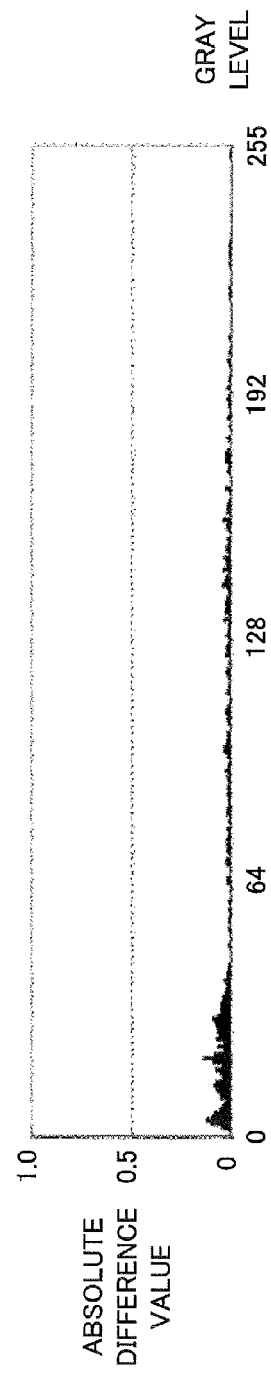
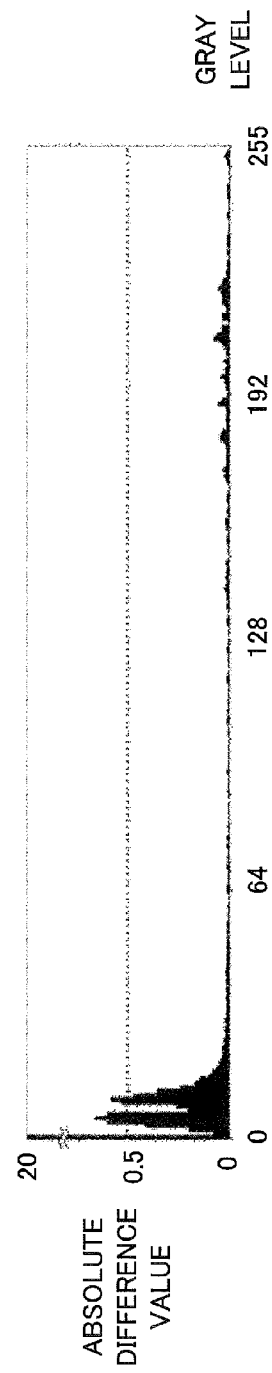

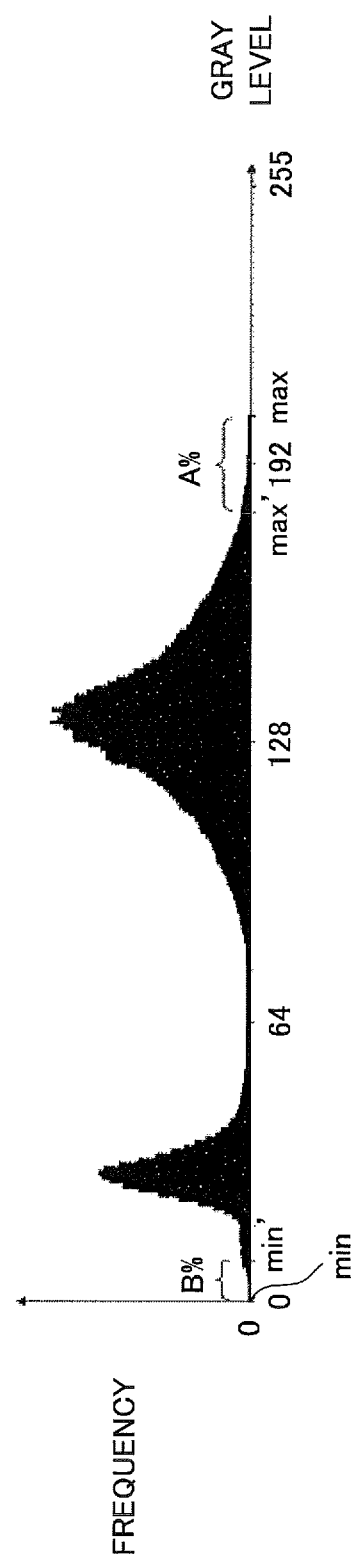

FIG. 6
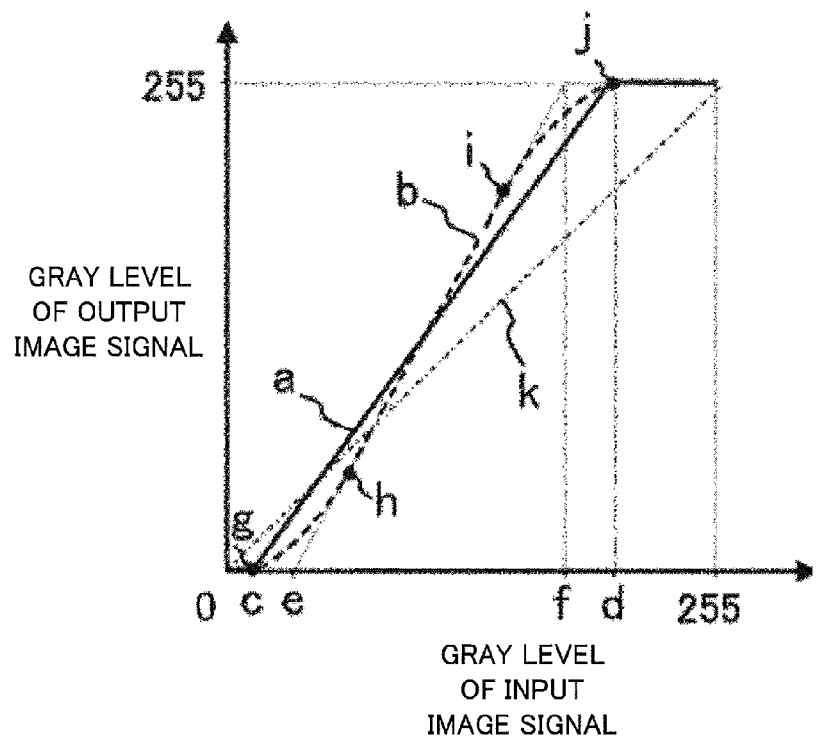
FIG. 7(a)           FIG. 7(b)           FIG. 7(c)
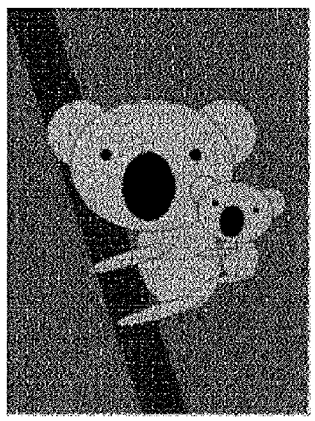 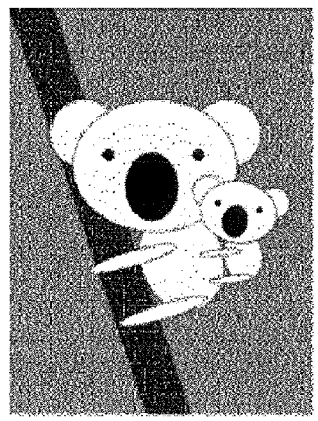 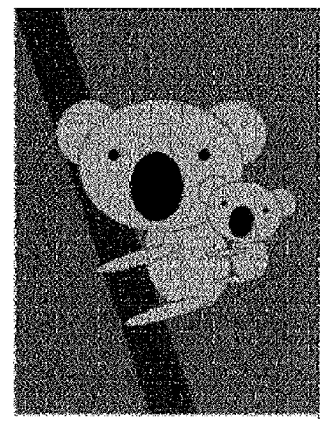

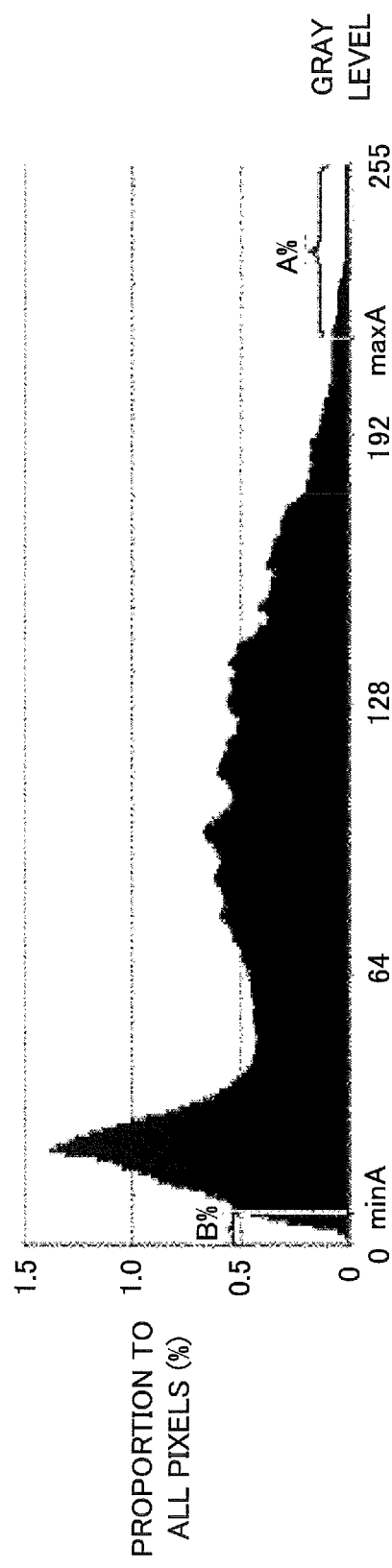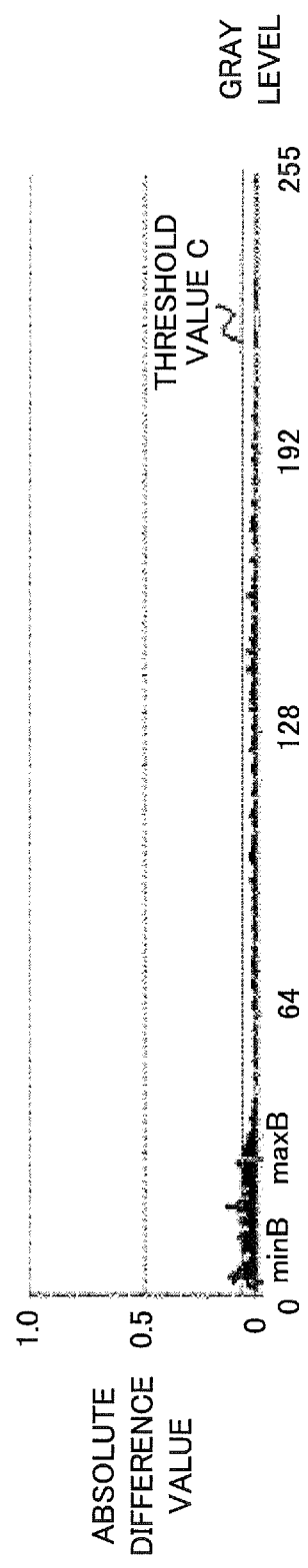
FIG. 10(a)
FIG. 10(b)

IMAGE PROCESSING DEVICE AND IMAGE PROCESSING METHOD

TECHNICAL FIELD

The present invention relates to an image processing device and an image processing method capable of controlling the gray scale of an image.

BACKGROUND ART

In order to enhance the gray scale of an image, the gray scale is corrected by calculating, with respect to plural image signals corresponding to respective pixels constituting the image, a maximum and a minimum of gray levels for each color component, and setting the maximum and minimum calculated for each color component as the maximum and minimum of the dynamic range of the gray scale for each color component in the image signal system of the corrected image (see, for example, Patent Documents 1 and 2).

PRIOR ART DOCUMENTS

Patent Documents

Patent Document 1: Japanese Patent Application Publication No. 2006-128986 (page 6, FIGS. 1 and 9)
Patent Document 2: Japanese Patent No. 4447035 (page 5, FIGS. 4 and 5)

SUMMARY OF THE INVENTION

Problems to be Solved by the Invention

However, there is a problem that when conventional gray scale correction is uniformly performed on images with different characteristics, change in color or loss of gradation occurs. For example, there is a problem that when conventional gray scale correction is performed on an image (such as a illustration) whose gray levels of the image signal concentrate in one part, unnecessary change in color or brightness occurs in a part originally represented by a uniform color.

The present invention has been made to solve the above-mentioned problems, and an object thereof is to provide an image processing device capable of determining a type of an image and performing gray scale correction according to the type of the image.

Means for Solving the Problems

An image processing device according to the present invention includes: a gray scale histogram calculator that calculates, with respect to an image signal having color components and gray scale components and forming an image, a gray scale histogram of the gray scale components for each color component; a maximum/minimum calculator that uses the gray scale histogram for each color component to calculate, for each color component, a maximum and a minimum of classes having a frequency greater than zero; an image type determiner that generates, from adjacent classes and frequencies in the gray scale histogram generated for each color component, an absolute difference value histogram for each color component, compares absolute difference values in the absolute difference value histograms with a predetermined threshold value to determine, according to the presence or absence of an absolute difference value exceeding the threshold value, a size of an area of image regions where the gray scale components are uniform, and determines an image type of the image according to the determination; a gray scale correction curve generator that generates a gray scale correction curve for correcting a gray scale of the image signal for each color component so that the largest and the smallest of the maximum and the minimum of the classes for each color component calculated by the maximum/minimum calculator are set as the maximum and the minimum of the gray scale correction curve; and a gray scale corrector that uses the gray scale correction curve to perform gray scale correction on the gray scale components of the image signal for each color component.

Effect of the Invention

Since the present invention determines an image type and generates a gray scale correction curve using the image type, it can perform gray scale correction according to the image type.

BRIEF DESCRIPTION OF THE DRAWINGS

FIGS. 3(*a*) and 3(*b*) each show an example of a histogram of absolute difference values of frequencies of adjacent classes in a gray scale histogram according to the first embodiment of the present invention.
FIGS. 4(*a*) to 4(*c*) each show an example of the histogram of absolute difference values of frequencies of adjacent classes in a gray scale histogram according to the first embodiment of the present invention.
FIG. 5 is an example of the gray scale histogram according to the first embodiment of the present invention.
FIG. 6 is an example of a gray scale correction curve according to the first embodiment of the present invention.
FIGS. 7(*a*) to 7(*c*) show an example of an image processed by the image processing device according to the first embodiment of the present invention.
FIGS. 10(*a*) and 10(*b*) are drawings for explaining the operation of a maximum/minimum calculator 3 according to a fourth embodiment of the present invention.

MODES FOR CARRYING OUT THE INVENTION

First Embodiment

Figure 1:
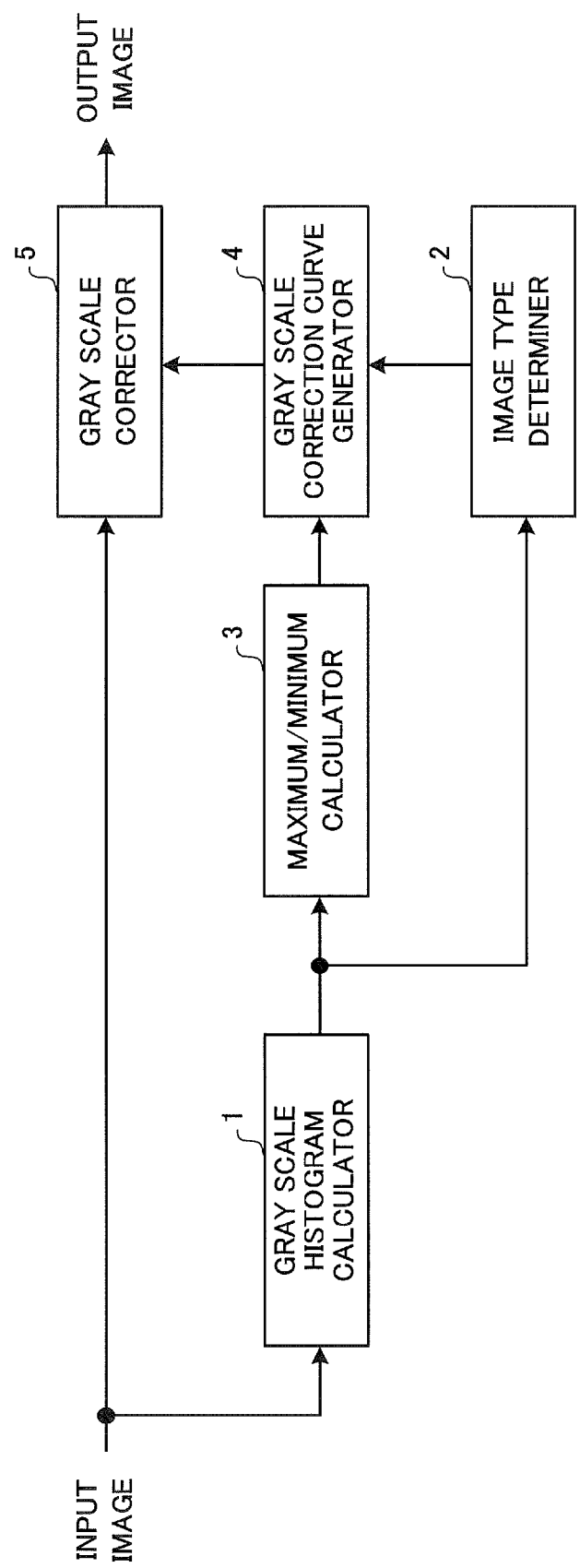
FIG. 1 is a block diagram of an image processing device according to a first embodiment of the present invention.

FIG. 1 is a block diagram showing the configuration of an image processing device according to the first embodiment for implementing the present invention. The image processing device according to this embodiment includes a gray scale histogram calculator 1, an image type determiner 2, a maximum/minimum calculator 3, a gray scale correction curve generator 4, and a gray scale corrector 5.

First, the configuration will be described. The gray scale histogram calculator 1 receives an input image signal, calculates a gray scale histogram of gray scale components for each color component of the input image signal, and outputs the gray scale histogram for each color component to the image type determiner 2 and maximum/minimum calculator 3.

The input image signal is an image signal forming an image, and includes the color components and the gray scale components.

The image type determiner 2 uses the gray scale histogram for each color component input from the gray scale histogram calculator 1 to calculate, for each color component, a ratio of the area of image regions where the gray scale components are uniform, determines the image type of the image on the basis of the ratios of the areas of the image regions where the gray scale components are uniform, and outputs the determination result to the gray scale correction curve generator 4.

The maximum/minimum calculator 3 uses the gray scale histogram for each color component input from the gray scale histogram calculator 1 to calculate, for each color component, a maximum and a minimum of the gray scale histogram, and outputs the maximum and minimum for each color component to the gray scale correction curve generator 4.

The gray scale correction curve generator 4 generates a gray scale correction curve on the basis of the determination result input from the image type determiner 2 and the maximum and minimum for each color component input from the maximum/minimum calculator 3 and outputs the gray scale correction curve to the gray scale corrector 5.

The gray scale corrector 5 uses the input image signal and the gray scale correction curve input from the gray scale correction curve generator 4 to convert the gray scale of the input image signal, and outputs the image signal after the conversion.

Next, the operation will be described. The input image signal is input to the gray scale histogram calculator 1 and gray scale corrector 5. The gray scale histogram calculator 1 generates a gray scale histogram of the gray scale components for each color component of the input image signal. The gray scale histogram is a histogram having gray levels as classes and the number of pixels or the proportion of pixels to the total number of pixels in the input image as frequency. Since the gray scale histogram is generated for each color component, the gray scale histogram calculator 1 calculates the same number of gray scale histograms as the color components.

Figure 2A:
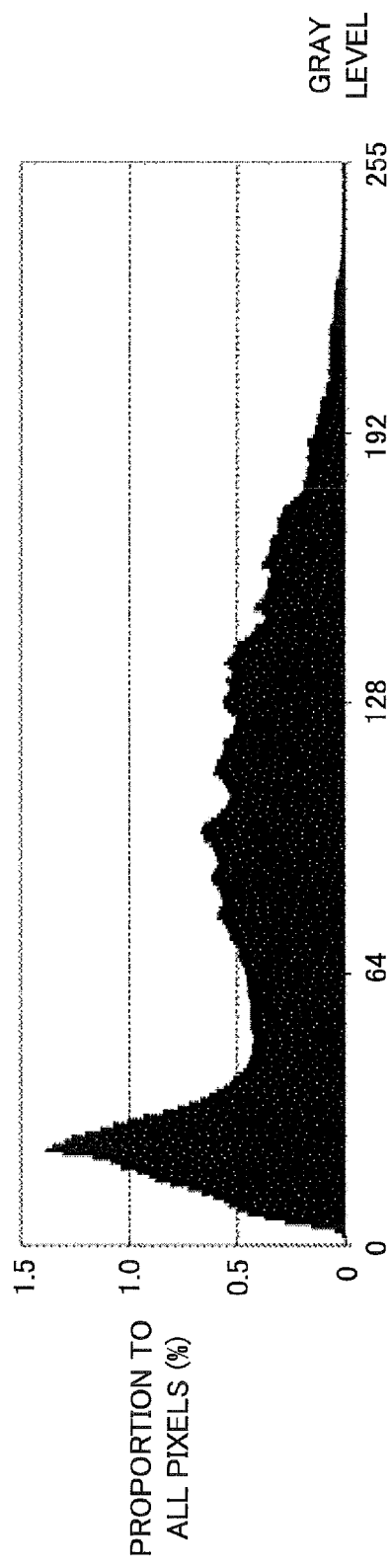
FIGS. 2(*a*) and 2(*b*) show an example of a gray scale histogram according to the first embodiment of the present invention.

An example of the gray scale histogram will be described, assuming that the color components of the input image signal consist of R, G, and B, and the gray scale components have 256 gray levels ranging from 0 to 255. FIG. 2(a) shows a gray scale histogram with the classes on the horizontal axis and the proportion (frequency) of pixels to the total number of pixels in the input image on the vertical axis. FIG. 2(a) shows an example of the gray scale histogram of the R component. In FIG. 2(a), the interval on the horizontal axis, that is, the class interval is identical to the gray level interval, which is 1. The class interval may be set to a value other than 1, such as 2, 4, 8, or 16. As the class interval becomes closer to 1, the gray scale correction becomes more faithful to the input image. However, as the class interval becomes smaller, the memory required to store the gray scale histogram becomes larger. The following description assumes that the class interval is identical to the gray level interval and is 1, i.e., that the classes on the horizontal axis in the gray scale histogram are identical to the gray levels.

The gray scale histograms of the respective color components, i.e., the gray scale histogram of the R component, the gray scale histogram of the G component, and the gray scale histogram of the B component are output from the gray scale histogram calculator 1 to the image type determiner 2 and maximum/minimum calculator 3.

Figure 2B:
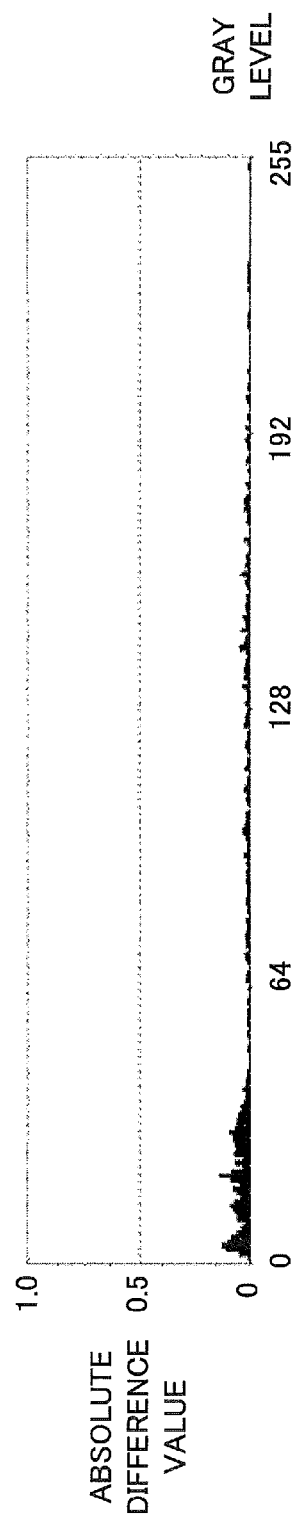

The image type determiner 2 uses the input gray scale histogram for each color component to calculate, for each color component, a ratio of the area of image regions where the gray scale components are uniform. FIG. 2(b) shows a histogram of the absolute values of the differences between the frequencies of adjacent classes in the gray scale histogram of the R component in FIG. 2(a). In FIG. 2(b), the horizontal axis represents the classes (gray levels) and the vertical axis represents the absolute difference value (%). The absolute difference values of the input image are calculated, the total number of the calculated absolute difference values being less by one than the number of the gray levels. In FIG. 2(b), since the class interval on the horizontal axis is identical to the gray level interval, which is 1, the total number of the absolute difference values of the input image is 255. The image type determiner 2 also calculates, for each of the gray scale histograms for the G and B components, a histogram of the absolute difference values between the frequencies of adjacent classes in the gray scale histogram, in the same manner as for the gray scale histogram for the R component.

FIGS. 3(a) and 3(b) show the histograms of the absolute difference values between the frequencies of adjacent classes in gray scale histograms of the R component. FIG. 3(a) shows an example of the absolute difference values of an image in which 'the area of regions of uniform color' is small; FIG. 3(b) shows an example of the absolute difference values of an image in which 'the area of regions of uniform color' is large. Here, for each color component, 'the area of regions of uniform color' corresponds to the area of image regions where the gray scale components are uniform.

As shown in FIGS. 3(a) and 3(b), the absolute difference values of an image in which the area of regions of uniform color is large has a characteristic that the maximum of the absolute difference values is extremely greater than the maximum of the absolute difference values of an image in which the area of regions of uniform color is small. Further, the absolute difference values of an image in which the area of regions of uniform color is large has a characteristic that the number of gray levels having an absolute difference value of 0 is greater than that of an image in which the area of regions of uniform color is small. That is, an image in which the area of regions of uniform color is large has a characteristic that it has a smaller number of colors than an image in which the area of regions of uniform color is small.

By using the absolute difference values of the gray scale histogram for each of the color components of R, G, and B, it is possible to determine whether the input image is an image in which the area of regions of uniform color is large. For example, in FIGS. 3(a) and 3(b), it will be assumed that a threshold value for the absolute difference values of the gray scale histogram is 20%. The image type determiner 2 compares the absolute difference values of the gray scale histogram for each of the color components of R, G, and B with the threshold value, and if there is an absolute difference value exceeding the threshold value, determines that the input image is an image in which the area of regions of uniform color is large.

The reason why whether the input image is an image in which the area of regions of uniform color is large is determined when gray scale correction is performed will now be described. The types of the input image include an image obtained by photographing an object by an electronic device such as a digital camera, and an image, such as a painting, a CG, or an illustration, obtained by designing colors and shapes by hand. Since the latter is painted to have color brightness intended by a creator, it has the following problems. If its brightness is changed due to gray scale correction or the like, it becomes an image against the intention of the creator, or if an object depicted on the image has a memory color of people, it changes to an image against the memory color. For example, gray scale correction may cause the following problems: an illustration that appears to have been drawn with a pencil becomes an illustration that appears to have been drawn with a ballpoint pen; a water painting becomes an oil painting; and an image of a gray animal becomes an image of a white animal.

Thus, when gray scale correction is performed, it is necessary to determine whether it is an image in which defects may occur due to gray scale correction. Images in which defects may occur due to gray scale correction have a common characteristic that they include a solid area (area filled with a single color). Thus, in this embodiment, it is necessary to determine whether it is an image including a solid area, i.e., whether it is an image in which the area of regions of uniform color is large, and if it is an image in which the area of regions of uniform color is large, control the gray scale correction not to be performed.

FIGS. 4(a) to 4(c) show an example of the absolute difference values of the gray scale histograms of an image, such as a scenery image, in which the area of regions of uniform color is small, unlike an illustration or the like. FIG. 4(a) shows the absolute difference values of the gray scale histogram for the R component; FIG. 4(b) shows the absolute difference values of the gray scale histogram for the G component; FIG. 4(c) shows the absolute difference values of the gray scale histogram for the B component. As shown at the minimum gray level in FIG. 4(c), even in an image in which the area of regions of uniform color is small, an absolute difference value of the gray scale histogram for a particular color component may be extremely large. Such an extremely large absolute difference value of the gray scale histogram may occur at the maximum gray level or minimum gray level, in the absolute difference values of the gray scale histogram for each color component.

As such, in an image that seems an image, such as a scenery image, in which the area of regions of uniform color is small, the absolute difference value of the gray scale histogram at the maximum class (maximum gray level) or minimum class (minimum gray level) may be extremely large. Such a phenomenon may occur in an image containing a lot of blue portions of the sky, green portions of plants, blocked up shadows or blown out highlights due to backlight, or the like.

Thus, the image type determiner 2 compares, for each color component, the absolute difference values of the gray scale histogram within a range excluding the maximum class and minimum class with a predetermined threshold value, and if there is a gray level with an absolute difference value exceeding the predetermined threshold value, determines that the input image is an image in which the area of regions of uniform color is large.

As described above, the image type determiner 2 calculates, for each color component, from the input gray scale histogram, the absolute difference values between the frequencies of adjacent classes in the gray scale histogram. Then, the image type determiner 2 compares the calculated absolute difference values within ranges excluding the maximum classes and minimum classes with the predetermined threshold value, and if there is an absolute difference value exceeding the threshold value, determines that the input image is an image in which the area of regions of uniform color is large. That is, the image type determiner 2 determines that the ratio of the area of image regions where the gray scale components are uniform is greater than or equal to a predetermined threshold value. Finally, the image type determiner 2 determines the image type of the image on the basis of the ratio of the area of image regions where the gray scale components are uniform, and outputs the determination result to the gray scale correction curve generator 4. The image type includes, for example, an image type in which the area of regions of uniform color is small, and an image type in which the area of regions of uniform color is large. The former includes a photographed image obtained by photographing an object. The latter includes a drawn image, such as a painting, a CG, or an illustration, obtained by designing colors and shapes by hand.

The maximum/minimum calculator 3 calculates, for each color component, a maximum and a minimum of the gray levels in the gray scale histogram output from the gray scale histogram calculator 1. FIG. 5 is an example of the gray scale histogram input to the maximum/minimum calculator 3. The operation of the maximum/minimum calculator 3 will be described using FIG. 5.

In FIG. 5, the horizontal axis represents the classes (gray levels) and the vertical axis represents the frequency. The maximum/minimum calculator 3 calculates, for each color component, a maximum class max and a minimum class min of the gray scale histogram. The minimum class min is the minimum of classes having a frequency greater than 0; the maximum class max is the maximum of the classes having a frequency greater than 0.

The maximum of the gray scale histogram is not limited to the maximum class max; it is possible to accumulate the frequencies from the maximum of the classes toward the minimum of the classes until the accumulated frequency exceeds A % (A is a predetermined percentage) of the total number of pixels in the input image, and determine, as the maximum class, the class maxA (denoted by max' in FIG. 5) corresponding to the last accumulated frequency. This makes it possible to accurately calculate the maximum of the gray scale histogram even if the input image signal includes noise. The value of A % may be set within a range of 1% to 5%, for example.

Similarly, it is possible to accumulate the frequencies from the minimum of the classes toward the maximum of the classes until the accumulated frequency exceeds a predetermined percentage (B %) of the total number of pixels in the input image, and determine, as the minimum, the class minA (denoted by min' in FIG. 5) corresponding to the last accumulated frequency. The greater the predetermined percentage (B %), the greater the slope of a gray scale correction curve, described later, and therefore the higher the effect of improvement by the gray scale correction. When the predetermined percentage (B %) used in the calculation of the minimum is less than the predetermined percentage (A %) used in the calculation of the maximum, a brighter output image can be obtained.

The maximum/minimum calculator 3 receives the gray scale histograms for the three color components of R, G, and B, and thus outputs, to the gray scale correction curve generator 4, a total of six values: the maximum of the R component, the minimum of the R component, the maximum of the G component, the minimum of the G component, the maximum of the B component, and the minimum of the B component.

The gray scale correction curve generator 4 generates a gray scale correction curve on the basis of the maximum and minimum of the classes of each color component input from the maximum/minimum calculator 3 and the determination result of the image type of the input image input from the image type determiner 2.

If the image type input from the image type determiner 2 is an image type in which the area of regions of uniform color is small, the gray scale correction curve generator 4 uses the maximum and minimum of each color component input from the maximum/minimum calculator 3 to generate a gray scale correction curve in the following procedure. If the image type input from the image type determiner 2 is an image type in which the area of regions of uniform color is large, the gray scale correction curve generator 4 generates, as described later, a gray scale correction curve that is a straight line with a slope of 1 and provides the gray scale of the output image signal equal to the gray scale of the input image signal.

First, the gray scale correction curve generator 4 calculates, as a maximum of gray levels of color signals, the largest of the maximum of the R component, the maximum of the G component, and the maximum of the B component input from the maximum/minimum calculator 3, and also calculates, as a minimum of the gray levels of the color signals, the smallest of the minimum of the R component, the minimum of the G component, and the minimum of the B component input from the maximum/minimum calculator 3.

FIG. 6 shows an example of the gray scale correction curve generated by the gray scale correction curve generator 4 in this embodiment. In FIG. 6, the horizontal axis represents the gray level of the input image signal and the vertical axis represents the gray level of the output image signal. The polygonal line indicated by character a and the curve line indicated by character b in the drawing are respectively a first gray scale correction curve and a second gray scale correction curve in this embodiment, described later. Each of characters c and e in the drawing indicates the minimum of the gray levels of the color signals calculated by the gray scale correction curve generator 4; each of characters d and f in the drawing indicates the maximum of the gray levels of the color signals calculated by the gray scale correction curve generator 4.

Here, c, d, e, and f are determined depending on the predetermined percentages A % and B % used in the calculation of the maximum gray level and minimum gray level of the gray scale histogram in FIG. 5. The gray level maxA at which the cumulative histogram reaches A % is d or f; the gray level minA at which the cumulative histogram reaches B % is c or e. When the predetermined percentage A % is small, the gray level maxA is d; when the predetermined percentage A % is large, the gray level maxA is f. Similarly, When the predetermined percentage B % is small, the gray level minA is c; when the predetermined percentage B % is large, the gray level minA is e. The straight line indicated by character k in the drawing is a straight line with a slope of 1.

The first gray scale correction curve is generated by using the minimum c and maximum d of the gray levels of the color signals. When the gray level of the input image signal is equal to or greater than 0 and less than c, the gray level of the output image signal is 0. When the gray level of the input image signal is equal to or greater than c and less than d, the gray level xo of the output image signal corresponding to the gray level xi of the input image signal is a value on a straight line represented by the following equation (1). When the gray level of the input image signal is equal to or greater than d and equal to or less than 255, the gray level of the output image signal is 255.

$$xo=(d-c)/255 \times (xi-c) \quad (1)$$

The second gray scale correction curve is generated by using the minimum e and maximum f of the gray levels of the color signals. When the gray level of the input image signal is equal to or greater than 0 and less than c, the gray level of the output image signal is 0. When the gray level of the input image signal is equal to or greater than d and equal to or less than 255, the gray level of the output image signal is 255. When the gray level of the input image signal is equal to or greater than c and less than d, a straight line represented by the following equation (2) is first determined.

$$xo=(f-e)/255 \times (xi-e) \quad (2)$$

Next, two points h and i on the straight line represented by the equation (2) are selected. For example, the point h is the point at which the gray level of the output image signal is 64, and the point i is the point at which the gray level of the output image signal is 192. However, this is not mandatory and it is sufficient that the points h and i are on the straight line represented by the equation (2). The point at which the gray level of the input image signal is c and the gray level of the output image signal is 0 is denoted by g; the point at which the gray level of the input image signal is d and the gray level of the output image signal is 255 is denoted by j; a curve smoothly connecting the four points g, h, i, and j is generated. The curve is, for example, a spline curve. When the gray level of the input image signal is equal to or greater than c and less than d, the gray level xo of the output image signal corresponding to the gray level xi of the input image signal is a value on the curve obtained as above.

If the determination result input from the image type determiner 2 indicates the image type in which the area of regions of uniform color is small, the gray scale correction curve generator 4 selects, as a final gray scale correction curve, one of the first gray scale correction curve and second gray scale correction curve. For example, if the following first to fourth conditions are all satisfied, the second gray scale correction curve is selected as the final gray scale correction curve; otherwise, the first gray scale correction curve is selected as the final gray scale correction curve. The first condition is that c is less than a first predetermined value; the second condition is that (e−c) is equal to or greater than a second predetermined value; the third condition is that d is equal to or greater than a third predetermined value; the fourth condition is that (f−d) is equal to or greater than a fourth predetermined value. When c is small or d is large, since the effect of gray scale correction is small, the second gray scale correction curve, which has a steeper slope and provides a higher effect of gray scale correction for intermediate gray levels, is desirable. When (e−c) or (f−d) is large, since the second gray scale correction curve has a larger number of gray levels at which the effect of gray scale correction is low in high gray levels and low gray levels than the first gray scale correction curve, the first gray scale correction curve, which provides a higher effect of gray scale correction for high gray levels and low gray levels, is desirable.

The first, second, third, and fourth predetermined values may be set to 16, 16, 224, and 32, respectively, for example.

On the other hand, if the determination result input from the image type determiner 2 indicates the image type in which the area of regions of uniform color is large, the gray scale correction curve generator 4 outputs, to the gray scale corrector 5, as the final gray scale correction curve, a gray scale correction curve that is the straight line indicated by k in FIG. 6, i.e., the straight line that has a slope of 1 and provides the gray scale of the output image signal identical to the gray scale of the input image signal.

Thus, the gray scale correction curve generator 4 outputs, as the final gray scale correction curve, to the gray scale corrector 5, the gray scale correction curve that is the straight line with a slope of 1 if the determination result input from the image type determiner 2 indicates the image type in which the area of regions of uniform color is large, and one of the first gray scale correction curve and second gray scale correction curve if the determination result input from the image type determiner 2 indicates the image type in which the area of regions of uniform color is small.

The gray scale corrector 5 converts, for each color component, the gray scale of the input image signal on the basis of the final gray scale correction curve input from the gray scale correction curve generator 4.

In the image processing device as configured in this manner, when the final gray scale correction curve input to the gray scale corrector 5 is the first gray scale correction curve, the gray scale is converted by the first gray scale correction curve. This provides an advantage of increasing the effect of gray scale correction for high gray levels and low gray levels. When the final gray scale correction curve input to the gray scale corrector 5 is the second gray scale correction curve, the gray scale is converted by the second gray scale correction curve. This provides an advantage of increasing the effect of gray scale correction for intermediate gray levels. When the final gray scale correction curve input to the gray scale corrector 5 is the gray scale correction curve that is the straight line with a slope of 1, the gray scale of the output image signal is the same as that of the input image signal. This makes it possible to prevent an image in which brightness change due to gray scale correction is undesirable from being processed. When the gray scale correction curve is the straight line with a slope of 1, since the gray scale of the output image signal is the same as that of the input image signal, the processing of converting the gray scale may be omitted.

As such, the image type determiner, which detects whether the input image signal is an image, such as a cartoon, a CG, or a painting, in which the area of regions of uniform color is large and determines the image type, is provided. This provides an advantage of maintaining the brightness of an image in which brightness change due to gray scale correction is undesirable and increasing the effect of gray scale correction for an image that requires brightness change due to gray scale correction.

FIGS. 7(a) to 7(c) show an example of an image processed by the image processing device in this embodiment. FIG. 7(a) is an input image; FIGS. 7(b) and 7(c) are output images. FIG. 7(a) is an example of an image in which the area of regions of uniform color is large, and is an illustration of a koala bear having a body color of gray. If gray scale correction is performed on the input image by using, for example, the above-described first gray scale correction curve without determining the image type as in the past, the gray scale correction changes the body color of the koala bear to white as shown in FIG. 7(b). On the other hand, the image processing device in this embodiment determines, by the image type determiner 2, that the input image is an image in which the area of regions of uniform color is large, and performs gray scale correction on the input image by using, as the final gray scale correction curve, the gray scale correction curve that is the straight line with a slope of 1 (or performs no gray scale correction processing). Thus, the body color of the koala bear can be maintained gray in the output image as shown in FIG. 7(c).

For each of the gray scale histograms, the image processing device according to this embodiment accumulates the frequencies from the maximum toward the minimum of the gray levels and determines, as a maximum, the gray level at which the accumulated frequency first exceeds a value of predetermined proportion of the total number of pixels in the input image signal. Thus, even if the input image signal includes noise, an accurate maximum of the gray levels can be calculated.

While in the past, a predetermined value is used as a threshold value used in calculation of a maximum of gray levels, this embodiment uses a predetermined proportion of the size (the total number of pixels) of the input image as the threshold value. This eliminates a problem that the threshold value varies with image size and the result of the correction differs between an enlarged image and a reduced image of the same image, for example.

A gray level lower than the maximum of the gray levels of the input image signal is calculated as a maximum. This increases the amount of gray scale correction in extending a gray level distribution to the high gray level side, and enables conversion to a brighter image.

Further, for each of the gray scale histograms, the image processing device according to this embodiment accumulates the frequencies from the minimum toward the maximum of the gray levels and determines, as a minimum, the gray level at which the accumulated frequency first exceeds a value of predetermined proportion of the total number of pixels in the input image signal. Thus, even if the input image signal includes noise, an accurate minimum of the gray level distribution can be calculated.

While in the past, a predetermined value is used as a threshold value used in calculation of a minimum of gray levels, the present invention uses a predetermined proportion of the size (the total number of pixels) of the input image as the threshold value. This eliminates a problem that the threshold value varies and the correction result differs depending on image size.

A gray level higher than the minimum of the gray levels of the input image signal is calculated as a minimum. This increases the amount of gray scale correction in extending a gray level distribution to the low gray level side, and enables conversion to an image having a higher effect of gray scale correction.

In this embodiment, the image type determiner 2 compares the absolute difference values of the gray scale histograms with a predetermined threshold value, and if there is a gray level having an absolute difference value exceeding the threshold value, determines that the input image is an image in which the area of regions of uniform color is large; but it may count the number of gray levels having an absolute difference value exceeding a threshold value, and determine, according to whether the counted number exceeds a predetermined value, whether the input image is an image in which the area of regions of uniform color is large.

For example, the threshold value for the absolute difference values of the gray scale histograms is set to 20%. The image type determiner 2 compares the absolute difference values of the gray scale histogram for each of the color components of R, G, and B with the threshold value, and counts the number of gray levels having an absolute difference value exceeding the threshold value. Then, if the counted number exceeds a predetermined value (e.g., 5), it may determine that the input image is an image in which the area of regions of uniform color is large. Such a determination makes it possible to take advantage of the characteristic that a drawn image, such as an illustration, has a small number of colors, making an accurate determination.

In this embodiment, the image type determiner 2 compares all of the frequencies from the minimum class to the maximum class in the absolute difference values of the gray scale histograms with the predetermined threshold value to determine whether the input image is an image in which the area of regions of uniform color is large; but it may compare the frequencies within a range excluding the minimum class and the maximum class of the absolute difference values of the gray scale histograms with the predetermined threshold value to determine whether the input image is an image in which the area of regions of uniform color is large.

This is because, even in an image in which the area of regions of uniform color is small, a class having an extremely large absolute difference value of a gray scale histogram may occur. This phenomenon occurs at only one or both of the minimum class and the maximum class. By comparing the frequencies within the ranges excluding the minimum classes and the maximum classes of the absolute difference values of the gray scale histograms with the predetermined threshold value, it becomes possible to correctly determine whether the input image is an image in which the area of regions of uniform color is large.

The image type determiner 2 may use only the gray scale histogram for the green component to calculate the absolute difference values of the gray scale histogram, and compares all the frequencies of the absolute difference values of the gray scale histogram with a predetermined threshold value to determine whether the input image is an image in which the area of regions of uniform color is large. This is because the phenomenon that an absolute difference value of a gray scale histogram is extremely large even in an image in which the area of regions of uniform color is small may occur in the absolute difference values of the gray scale histograms for the red component and blue component, but does not occur in the absolute difference values of the gray scale histogram for the green component, which is close to a luminance component. Using only the gray scale histogram for the green component makes it possible to remove calculation, such as the calculation of the absolute difference values and the comparison with the threshold value, required when the gray scale histograms for the other color components are also used, and correctly determine whether the input image is an image in which the area of regions of uniform color is large.

This embodiment describes a configuration in which the gray scale correction curve generator 4 selects the final gray scale correction curve from among the generated plurality of gray scale correction curves and outputs the selected final gray scale correction curve to the gray scale corrector 5; but another configuration is possible in which the gray scale correction curve generator 4 outputs all of the generated gray scale correction curves to the gray scale corrector 5 without selecting the final gray scale correction curve, and the gray scale corrector 5 selects, from among the input gray scale correction curves, the final gray scale correction curve to use for the gray scale correction.

Second Embodiment

While the image type determiner 2 in the first embodiment determines whether the input image is an image in which the area of regions of uniform color is large or an image in which the area of regions of uniform color is small to determine the image type of the input image, the second embodiment grades the image type of the input image on the basis of the area of regions of uniform color.

The image processing device in this embodiment has the same configuration as the image processing device in the first embodiment, and includes a gray scale histogram calculator, an image type determiner, a maximum/minimum calculator, a gray scale correction curve generator, and a gray scale corrector. This embodiment differs from the first embodiment in the method of determining the image type by the image type determiner and the method of selecting the final gray scale correction curve by the gray scale correction curve generator.

The types of the input image will now be described. An image may not be able to be classified into either an image obtained by photographing an object by an electronic device such as a digital camera, and an image, such as a painting, a CG, or an illustration, obtained by designing colors and shapes by hand. For example, the former may be processed into a painting-like image. The latter may be an image that is so close to a photographed image that it cannot be distinguished from the former. In order to perform finely-tuned image processing on them, it is necessary to calculate a degree indicating whether it is close to a photographed image or a designed image to determine the image type and perform gray scale correction according to the determined image type.

The image type determiner uses the input gray scale histogram for each color component to calculate histograms of the absolute difference values between the frequencies of adjacent classes in the gray scale histograms, as in the first embodiment. Although the first embodiment sets a threshold value and if the histograms of the absolute difference values include an absolute difference value exceeding the threshold value, determines that the input image is an image in which the area of regions of uniform color is large, this embodiment uses a maximum of the histograms of the absolute difference values to determine a degree of size of the area of regions of uniform color in the input image.

The larger the area of regions of uniform color in the input image, the greater the maximum of the histograms of the absolute difference values. With this characteristic, the image type determiner determines a uniform level according to the maximum of the histograms of the absolute difference values as follows: the uniform level is 0 if the maximum is less than 5%; the uniform level is 1 if the maximum is from 5% to 10%; the uniform level is 2 if the maximum is from 10% to 15%; the uniform level is 3 if the maximum is from 15% to 20%; the uniform level is 4 if the maximum is from 20% to 25%; and the uniform level is 5 if the maximum is equal to or greater than 25%. The image type determiner determines the degree of size of the area of regions of uniform color by using the uniform level. According to this determination, the larger the area of regions of uniform color in the input image, the greater the value of the uniform level.

Finally, the image type determiner outputs, as the determination result of the image type, the determination result of the uniform level (one of the uniform levels of 0 to 5) to the gray scale correction curve generator.

Next, the operation of the gray scale correction curve generator in this embodiment will be described. In the gray scale correction curve generator, the method of calculating a maximum and a minimum of gray levels by using the gray scale histogram for each color component input from the gray scale histogram calculator in the maximum/minimum calculator is the same as in the first embodiment.

Figure 8:
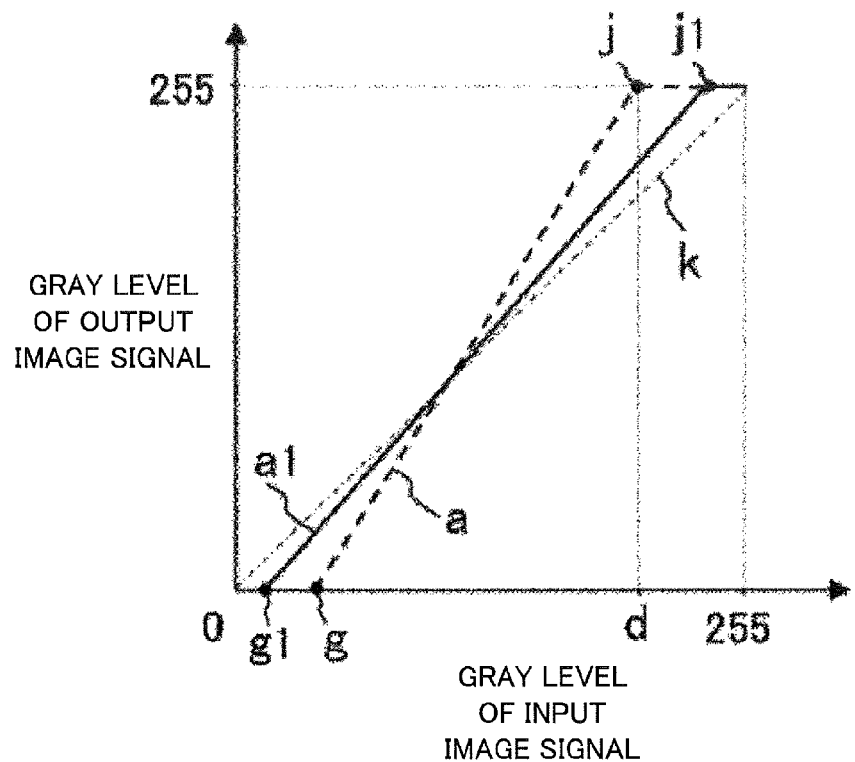
FIG. 8 is an example of a gray scale correction curve according to a second embodiment of the present invention.

FIG. 8 shows an example of the gray scale correction curve generated by the gray scale correction curve generator in this embodiment. In FIG. 8, the horizontal axis represents the gray level of the input image signal and the vertical axis represents the gray level of the output image signal. Of the reference characters in the drawing, the reference characters a, d, g, j, and k, which are also shown in FIG. 6 used in the description of the first embodiment, indicate the same lines and points as those in FIG. 6. The polygonal line indicated by character a1 in the drawing is a third gray scale correction curve used in this embodiment.

In FIG. 8, the point g1 in the drawing is a point that internally divides the line segment connecting the point (origin) at which both of the gray levels of the input image signal and output image signal are 0 and the point g, according to the uniform level input from the image type determiner. In this case, the internal division is performed in such a manner that the point g1 approaches the point g as the uniform level becomes smaller. For example, when the uniform level of the input image is 3 of the five levels in total, the point g1 internally divides the line segment connecting the origin and the point g at a ratio of 2:3.

Further, the point j1 in the drawing is a point that internally divides the line segment connecting the point j and the point (referred to below as the maximum point) at which both of the gray levels of the input image signal and output image signal are 255, according to the uniform level input from the image type determiner. In this case, the internal division is performed in such a manner that the point j1 approaches the point j as the uniform level becomes smaller. For example, when the uniform level of the input image is 3 of the five levels in total, the point j1 internally divides the line segment connecting the point j and the maximum point at a ratio of 3:2. A polygonal line connecting the origin, point g1, point j1, and maximum point is determined as the third gray scale correction curve a1 in this embodiment. In this manner, the third gray scale correction curve is generated.

Figure 9:
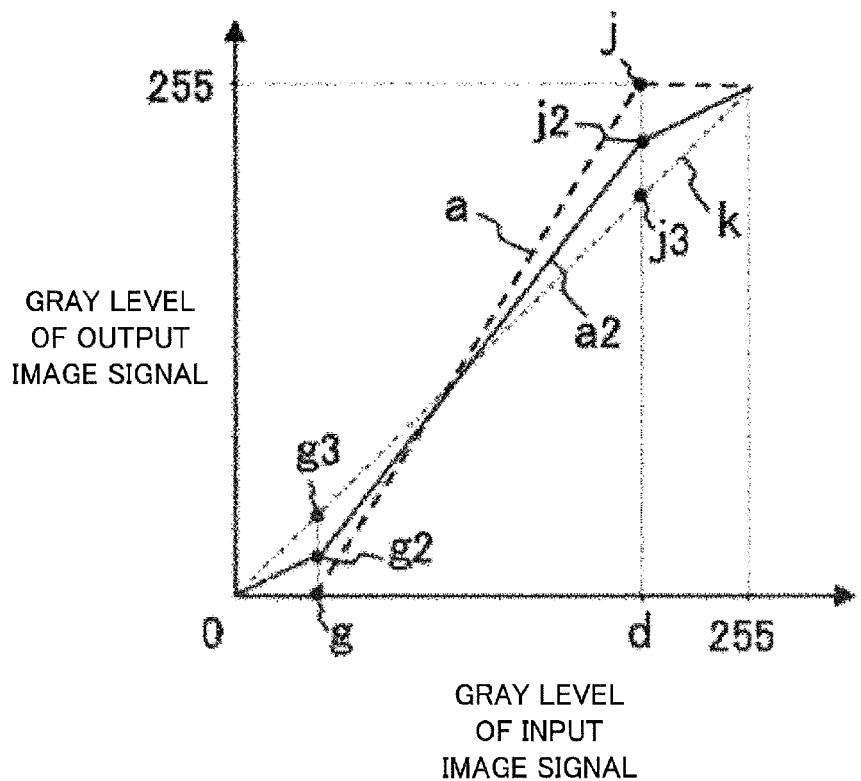
FIG. 9 is an example of the gray scale correction curve according to the second embodiment of the present invention.

FIG. 9 shows an example of another gray scale correction curve, differing from the third gray scale correction curve, generated by the gray scale correction curve generator in this embodiment. In FIG. 9, the horizontal axis represents the gray level of the input image signal and the vertical axis represents the gray level of the output image signal. Of the reference characters in the drawing, the reference characters a, d, g, j, and k, which are also shown in FIG. 6 used in the description of the first embodiment, indicate the same lines and points as those in FIG. 6. The polygonal line indicated by character a2 in the drawing is a fourth gray scale correction curve used in this embodiment. The gray scale correction curve is the same as the third gray scale correction curve described in FIG. 8 in that the gray scale correction curve is generated on the basis of the uniform level input from the image type determiner, but it is generated using points differing from those for the third gray scale correction curve.

In FIG. 9, the point j3 in the drawing is a point on the straight line k and has the same gray level of the input image signal as the point d. The point g3 is a point on the straight line k and has the gray level of the input image signal at the point g. The point j2 is a point that internally divides the line segment connecting the points j and j3; the point g2 is a point that internally divides the line segment connecting the points g and g3. In this case, the internal divisions are performed in such a manner that the points j2 and g2 approach the points j and g as the uniform level becomes smaller. For example, when the uniform level is 3 of the five levels in total, the point j2 internally divides the line segment connecting the points j and j3 at a ratio of 3:2, and the point g2 internally divides the line segment connecting the points g and g3 at a ratio of 3:2. A polygonal line connecting the origin, point g2, point j2, and maximum point is determined as the fourth gray scale correction curve a2 in this embodiment. In this manner, the fourth gray scale correction curve is generated.

Even when one of the third gray scale correction curve and fourth gray scale correction curve is generated, if the uniform level input from the image type determiner is 0, the polygonal line indicated by a in FIGS. 8 and 9 is determined as the gray scale correction curve, and if the uniform level input from the image type determiner is 5, the straight line indicated by k in FIGS. 8 and 9 is determined as the gray scale correction curve.

The difference in the effect of gray scale correction between the third gray scale correction curve and the fourth gray scale correction curve will be described. Since the third gray scale correction curve has a larger slope in high gray levels and low gray levels than that of the fourth gray scale correction curve, it can provide a higher effect of gray scale correction for high gray levels and low gray levels. Since the fourth gray scale correction curve has a larger slope in intermediate gray levels than that of the third gray scale correction curve, it can provide a higher effect of gray scale correction for intermediate gray levels.

Finally, the gray scale correction curve generator selects, as a final gray scale correction curve, one of the third gray scale correction curve and fourth gray scale correction curve generated according to the uniform level, which is the determination result of the image type, and outputs the final gray scale correction curve to the gray scale corrector. An example of the method of selecting one of the third and fourth gray scale correction curves selects the fourth gray scale correction curve if the slope of the polygonal line of the third gray scale correction curve is below, for example, 1.15. This is because, when the slope of the polygonal line of the third gray scale correction curve is below 1.15, the effect of gray scale correction of an image with the third gray scale correction curve is smaller than that with the fourth gray scale correction curve.

The gray scale corrector converts, for each color component, the gray scale of the input image signal on the basis of the final gray scale correction curve input from the gray scale correction curve generator. When the input final gray scale correction curve is the third gray scale correction curve, the gray scale is converted with the third gray scale correction curve. This provides an advantage of increasing the effect of gray scale correction for high gray levels and low gray levels. When the input final gray scale correction curve is the fourth gray scale correction curve, the gray scale is converted with the fourth gray scale correction curve. This provides an advantage of increasing the effect of gray scale correction for intermediate gray levels.

Even when the input final gray scale correction curve is one of the third gray scale correction curve and fourth gray scale correction curve, if the uniform level determined by the image type determiner is 5, since it is the gray scale correction curve that is the straight line with a slope of 1, the gray scale of the output image signal is made identical to the gray scale of the input image signal. This makes it possible to prevent an image in which brightness change due to gray scale correction is undesirable from being processed, as in the first embodiment. When the uniform level is 5, since the gray scale of the output image signal is the same as that of the input image signal, the processing of converting the gray scale may be omitted.

The image processing device as configured in this manner includes the image type determiner that determines the image type according to the area of regions of uniform color in the input image signal. This provides an advantage of maintaining the brightness of an image in which brightness change due to gray scale correction is undesirable and increasing the effect of gray scale correction for an image that requires brightness change due to gray scale correction, according to the area of regions of uniform color.

Third Embodiment

While in the second embodiment, when the image type determiner grades the image type of the input image on the basis of the area of regions of uniform color, it determines a degree of size of the area of regions of uniform color in the input image by using the maximum of the histograms of the absolute difference values, the third embodiment determines a degree of size of the area of regions of uniform color according to the number of gray levels at which a predetermined threshold value is exceeded in the histograms of the absolute difference values.

The image processing device in this embodiment has the same configuration as the image processing device in the first embodiment, and includes a gray scale histogram calculator, an image type determiner, a maximum/minimum calculator, a gray scale correction curve generator, and a gray scale corrector. The image type determiner in this embodiment determines the image type by a method different from those in the first and second embodiments.

The image type determiner uses the input gray scale histogram for each color component to calculate histograms of the absolute difference values between the frequencies of adjacent gray levels in the gray scale histograms, as in the first embodiment. This embodiment sets a predetermined threshold value for the histograms of the absolute difference values, and counts the number of gray levels at which the threshold value is exceeded in the histograms of the absolute difference values to determine a degree of size of the area of regions of uniform color in the input image.

When there are many solid portions with different colors, the histograms of the absolute difference values include many steep peaks. With this characteristic, the image type determiner sets a threshold value, e.g., 20%, and determines a uniform level according to the number of gray levels at which the threshold value is exceeded in the histograms of the absolute difference values as follows: the uniform level is 0 if the number of gray levels is 0; the uniform level is 1 if the number of gray levels is 1 or 2; the uniform level is 2 if the number of gray levels is 3 or 4; the uniform level is 3 if the number of gray levels is 5 to 8; the uniform level is 4 if the number of gray levels is 9 to 16; and the uniform level is 5 if the number of gray levels is 17 or greater. The image type determiner determines the degree of size of the area of regions of uniform color by using the uniform level. According to this determination, the more solid portions with different colors, that is, the larger the area of regions of uniform color in the input image, the greater the value of the uniform level.

Finally, the image type determiner outputs, as the determination result of the image type, the determination result of the uniform level (one of the uniform levels of 0 to 5) to the gray scale correction curve generator.

As in the second embodiment, the gray scale correction curve generator generates a third gray scale correction curve and fourth gray scale correction curve on the basis of the uniform level input from the image type determiner, determines a final gray scale correction curve on the basis of the uniform level input from the image type determiner, and outputs the final gray scale correction curve to the gray scale corrector.

The gray scale corrector converts, for each color component, the gray scale of the input image signal on the basis of the final gray scale correction curve input from the gray scale correction curve generator, as in the second embodiment.

The image processing device as configured in this manner includes the image type determiner that determines the image type according to the area of regions of uniform color in the input image signal. This provides an advantage of maintaining the brightness of an image in which brightness change due to gray scale correction is undesirable and increasing the effect of gray scale correction for an image that requires brightness change due to gray scale correction, according to the area of regions of uniform color.

In the second and third embodiments, the uniform level is rated on a five-step scale of 1 to 5 to determine the degree of size of the area of regions of uniform color; but the number of steps of the uniform level is not limited to this and arbitrary.

The first to third embodiments describe R, G, and B as the color components; but the color components are not limited to this and may be C, M, Y, and K used in printing machines or the like. They also may be HSV or YCbCr; in this case, the gray scale correction curve generator needs to generate the gray scale correction curve so that the gray scale correction causes no change in the color. For example, in the case of HSV, it is desirable to generate gray scale correction curves for S and V to convert an image signal without changing H. In the case of YCbCr, since the relation between Cb and hue and the relation between Cr and hue are complicated, it is desirable to convert them into R, G, and B and then apply processing in which the ratio between R, G, and B is not changed before and after the gray scale correction.

Fourth Embodiment

In the first embodiment, the maximum/minimum calculator 3 calculates a maximum of a gray scale histogram from a frequency obtained by accumulating the gray scale histogram from the maximum toward the minimum of the classes, and calculates a minimum of a gray scale histogram from a frequency obtained by accumulating the gray scale histogram from the minimum toward the maximum of the classes. The fourth embodiment calculates a maximum of a gray scale histogram from a frequency obtained by accumulating the gray scale histogram from the maximum toward the minimum of the classes and the absolute difference values of the gray scale histogram, and calculates a minimum of the gray scale histogram from a frequency obtained by accumulating the gray scale histogram from the minimum toward the maximum of the classes and the absolute difference values of the gray scale histogram.

The image processing device in this embodiment has the same configuration as the image processing device in the first embodiment, and includes a gray scale histogram calculator, an image type determiner, a maximum/minimum calculator, a gray scale correction curve generator, and a gray scale corrector. The maximum/minimum calculator in this embodiment calculates the maximum and minimum by a method different from that in the first embodiment.

The operation of the maximum/minimum calculator in this embodiment will be described. The maximum/minimum calculator receives the gray scale histogram for each color component from the gray scale histogram calculator. The maximum/minimum calculator calculates, for each color component, a maximum and a minimum in the gray scale histogram and outputs them to the gray scale correction curve generator.

A method of calculating a maximum and a minimum in a gray scale histogram will be described using FIGS. 10(a) and 10(b). FIG. 10(a) shows an example of the gray scale histogram of the R component, assuming that the color components of the input image signal consist of R, G, and B, and the gray scale components have 256 gray levels ranging from 0 to 255. FIG. 10(a) is a gray scale histogram having a horizontal axis representing gray levels and a vertical axis representing the proportion (frequency) of pixels to the total number of pixels in the input image. While in general, a histogram is a distribution having a horizontal axis representing classes and a vertical axis representing frequency, in this embodiment, the class interval is equal to the gray level interval and thus the values of the classes are equal to the values of the gray levels.

As in the first embodiment, first, the maximum/minimum calculator accumulates the frequencies of the gray scale histogram from the maximum toward the minimum of the gray levels and obtains the gray level maxA at which the accumulated frequency first exceeds A % (A is a predetermined value) of the total number of pixels in the input image. In this embodiment, the gray level maxA is obtained as a first candidate maximum. Then, it accumulates the frequencies of the gray scale histogram from the minimum toward the maximum of the gray levels and obtains the gray level minA at which the accumulated frequency first exceeds B % (B is a predetermined value) of the total number of pixels in the input image. In this embodiment, the gray level minA is obtained as a first candidate minimum.

The first embodiment determines, as a maximum of the gray scale histogram, instead of the maximum gray level, the gray level at which a value obtained by accumulating the gray scale histogram from the maximum gray level reaches the percentage A % of all the pixels. This aims to accurately calculate a maximum of the gray scale histogram even if the input image signal includes noise. The first embodiment also determines, as a minimum of the gray scale histogram, instead of the minimum gray level, the gray level at which a value obtained by accumulating the gray scale histogram from the minimum gray level reaches the percentage B % of all the pixels. This aims to accurately calculate a minimum of the gray scale histogram even if the input image signal includes noise.

Since A % and B % are fixed values, the method of the first embodiment regards, as noise, gray levels within a range from the maximum gray level to the gray level of A % and from the minimum gray level to the gray level of B % with respect to all the pixels, regardless of the shape of the gray scale histogram. However, depending on the image, the range to the gray level of A % and the range to the gray level of B % may include a gray level that is not noise but important. If an important gray level is regarded as noise, since the gray scale corrector following the maximum/minimum calculator performs processing to reduce gray level difference with respect to gray levels from the maximum of the gray scale histogram to 255 and from 0 to the minimum of the gray scale histogram, a defect of loss of gradation may be caused.

Thus, this embodiment calculates the maximum and minimum by taking advantage of characteristics of noise in the shape of the gray scale histogram. The characteristics of noise of the gray scale histogram include the following: a first characteristic that the proportion relative to all the pixels is small; and a second characteristic that a sharp change (increase or decrease) at a particular gray level does not occur. The first candidate maximum and first candidate minimum are an example that takes advantage of the first characteristic. They take advantage of the fact that the proportion relative to all the pixels is small and therefore the accumulated value is also small. Following the calculation of the first candidate maximum and first candidate minimum, the maximum/minimum calculator calculates a second candidate maximum and a second candidate minimum by taking advantage of the second characteristic.

FIG. 10(b) shows the histogram of the absolute difference values between the frequencies of adjacent gray levels in the gray scale histogram of the R component in FIG. 10(a). In FIG. 10(b), the horizontal axis represents the gray levels and the vertical axis represents the absolute difference value (%). The absolute difference values indicate variation in the gray scale histogram. In gray levels of only noise, a gray level does not increase sharply; that is, a gray level at which the gray scale histogram changes sharply is a gray level with other than noise. The absolute difference values are compared with a predetermined threshold value C; the minimum gray level minB of the gray levels having an absolute difference value exceeding the threshold value C is determined as the second candidate minimum; the maximum gray level maxB of the gray levels having an absolute difference value exceeding the threshold value C is determined as the second candidate maximum. The threshold value C is, for example, 0.1.

Finally, the first candidate minimum and the second candidate minimum are compared with each other, and the smaller is determined as the minimum of the gray scale histogram. The first candidate maximum and the second candidate maximum are compared with each other, and the larger is determined as the maximum of the gray scale histogram. In the case of FIGS. 10(a) and 10(b), the maximum of the gray scale histogram is maxA, and the minimum of the gray scale histogram is minB.

The image processing device as configured in this manner calculates the maximum and minimum of the gray scale histogram by taking advantage of characteristics of noise in the shape of the gray scale histogram. This provides an advantage of being able to accurately calculate the maximum and minimum of important gray levels other than noise.

Further, the larger the maximum of the gray scale histogram, the larger the effect of the gray scale correction of the present invention. The smaller the minimum of the gray scale histogram, the larger the effect of the gray scale correction of the present invention. In the first embodiment, the larger the values of both A % and B %, the larger the maximum of the gray scale histogram and the smaller the minimum of the gray scale histogram. However, the larger the values of A % and B %, the more likely an important gray level is to be regarded as noise, the more likely the gray scale correction of the present invention is to cause loss of gradation. However, since this embodiment calculates the maximum and minimum by taking advantage of the characteristics of noise, it can accurately calculate the maximum and minimum of the gray scale histogram and maximize the effect of the gray scale correction of the present invention.

This embodiment compares the absolute difference values of the gray scale histogram with the threshold value to calculate a candidate maximum and a candidate minimum; but a method of calculating a candidate maximum and a candidate minimum is not limited to this and it is sufficient that they are obtained by taking advantage of characteristics of noise of the gray scale histogram. For example, taking advantage of the characteristic that the proportion to all the pixels is small, an example compares the frequencies in the gray scale histogram with a predetermined threshold value to determine the minimum gray level of the gray levels having a frequency exceeding the predetermined threshold value as a candidate minimum and the maximum gray level of the gray levels having a frequency exceeding the predetermined threshold value as a candidate maximum. The predetermined threshold value is, for example, a sufficiently small value such as 0.1.

With the characteristic that a sharp change at a particular gray level does not occur, difference values of the gray scale histogram is compared with a predetermined threshold value. A difference value of the gray scale histogram indicates a slope of the gray scale histogram and thus may be a negative value. The minimum gray level of gray levels at which the difference value of the gray scale histogram sharply increases is determined as a candidate minimum. It is obtained by comparing the difference values of the gray scale histogram with a predetermined positive threshold value to calculate the minimum gray level of the gray levels having a difference value exceeding the predetermined threshold value. The maximum gray level of gray levels at which the difference value of the gray scale histogram sharply decreases is determined as a candidate maximum. It is obtained by comparing the difference values of the gray scale histogram with a predetermined negative threshold value to calculate the maximum gray level of the gray levels having a difference value below the predetermined negative threshold value. The predetermined positive threshold value is 0.1, and the predetermined negative threshold value is −0.1, for example.

REFERENCE CHARACTERS 1 gray scale histogram calculator, 2 image type determiner, 3 maximum/minimum calculator, 4 gray scale correction curve generator, 5 gray scale corrector.

What is claimed is:

1. An image processing device comprising:
   a gray scale histogram calculator that calculates, with respect to an image signal having color components and gray scale components and forming an image, a gray scale histogram of the gray scale components for each color component, each gray scale histogram having classes each having a frequency;
   a maximum/minimum calculator that uses the gray scale histogram for each color component to calculate, for each color component, a maximum and a minimum of classes having a frequency greater than zero in the gray scale histogram;
   an image type determiner that generates, for each color component, an absolute difference value histogram having classes each having an absolute difference value between the frequencies of adjacent classes in the gray scale histogram, compares the absolute difference values in the absolute difference value histograms with a predetermined threshold value to determine, according to the presence or absence of an absolute difference value exceeding the threshold value, a size of an area of image regions where the gray scale components are uniform, and determines an image type of the image according to the determination;
   a gray scale correction curve generator that generates a gray scale correction curve for correcting a gray scale of the image signal for each color component, on a basis of a largest and a smallest of the maximum and the minimum of the classes for each color component calculated by the maximum/minimum calculator and the determination of the image type; and
   a gray scale corrector that uses the gray scale correction curve to perform gray scale correction on the gray scale components of the image signal for each color component,
   wherein for each color component, the maximum/minimum calculator:
      calculates, as a first maximum, a class at which an accumulated value exceeds a predetermined proportion of a total frequency of the gray scale histogram, the accumulated value being obtained by accumulating the frequencies from a maximum class toward a minimum class in the gray scale histogram;
      calculates, as a first minimum, a class at which an accumulated value exceeds a predetermined proportion of the total frequency of the gray scale histogram, the accumulated value being obtained by accumulating the frequencies from the minimum class toward the maximum class in the gray scale histogram;
      compares the absolute difference values in the absolute difference value histogram with a predetermined threshold value to obtain a minimum of classes having an absolute difference value exceeding the threshold value as a second minimum and a maximum of the classes having an absolute difference value exceeding the threshold value as a second maximum;
      determines, as the minimum of the classes, a smaller of the first minimum and the second minimum; and
      determines, as the maximum of the classes, a larger of the first maximum and the second maximum.

2. The image processing device of claim 1, wherein the gray scale correction curve generator generates the gray scale correction curve so that, for each color component, the largest corresponds to a maximum of gray levels of the image signal after the gray scale correction and the smallest corresponds to a minimum of the gray levels of the image signal after the gray scale correction.

3. The image processing device of claim 1, wherein the image type determiner determines whether there is, in the absolute difference value histograms, a class having an absolute difference value exceeding a predetermined proportion of the total frequency of the gray scale histogram, and if there is a class having an absolute difference value exceeding the predetermined proportion, determines that the image type is one in which an area of image regions where the gray scale components are uniform is larger than or equal to a predetermined proportion.

4. The image processing device of claim 3, wherein the image type determiner uses the absolute difference value histograms excluding minimum classes and maximum classes.

5. The image processing device of claim 3, wherein the color components include a green component, and the image type determiner uses the gray scale histogram for the green component of the gray scale histograms for the color components.

6. The image processing device of claim 3, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

7. The image processing device of claim 1, wherein the image type determiner obtains a maximum of the absolute difference values in the absolute difference value histograms, and determines, according to the obtained maximum, the image type of the image.

8. The image processing device of claim 7, wherein the image type determiner uses the absolute difference value histograms excluding minimum classes and maximum classes.

9. The image processing device of claim 7, wherein the color components include a green component, and the image type determiner uses the gray scale histogram for the green component of the gray scale histograms for the color components.

10. The image processing device of claim 7, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

11. The image processing device of claim 1, wherein the image type determiner obtains the number of classes having an absolute difference value exceeding a predetermined threshold value in the absolute difference value histograms, and determines the image type of the image according to the obtained number of classes having an absolute difference value exceeding the predetermined threshold value.

12. The image processing device of claim 11, wherein the image type determiner uses the absolute difference value histograms excluding minimum classes and maximum classes.

13. The image processing device of claim 11, wherein the color components include a green component, and the image type determiner uses the gray scale histogram for the green component of the gray scale histograms for the color components.

14. The image processing device of claim 11, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

15. The image processing device of claim 1, wherein the image type determiner uses the absolute difference value histograms excluding minimum classes and maximum classes.

16. The image processing device of claim 15, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

17. The image processing device of claim 1, wherein the color components include a green component, and the image type determiner uses only the gray scale histogram for the green component of the gray scale histograms for the color components.

18. The image processing device of claim 17, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

19. The image processing device of claim 1, wherein:
the gray scale correction curve generator generates a plurality of gray scale correction curves on a basis of the maximum and the minimum of the classes for each color component; and
the gray scale correction curve generator or the gray scale corrector selects one of the generated plurality of gray scale correction curves as the gray scale correction curve to be used in the gray scale correction.

20. An image processing method comprising:
calculating, using a gray scale histogram calculator, with respect to an image signal having color components and gray scale components and forming an image, a gray scale histogram of the gray scale components for each color component, each gray scale histogram having classes each having a frequency;
using the gray scale histogram for each color component to calculate, using a maximum/minimum calculator, for each color component, a maximum and a minimum of classes having a frequency greater than zero in the gray scale histogram;
generating, using an image type determiner, for each color component, an absolute difference value histogram having classes each having an absolute difference value between the frequencies of adjacent classes in the gray scale histogram, comparing the absolute difference values in the absolute difference value histograms with a predetermined threshold value to determine, according to the presence or absence of an absolute difference value exceeding the threshold value, a size of an area of image regions where the gray scale components are uniform, and determining an image type of the image according to the determination;
generating, using a gray scale correction curve generator, a gray scale correction curve for correcting a gray scale of the image signal for each color component, on a basis of a largest and a smallest of the maximum and the minimum of the classes for each color component and the determination of the image type; and
using the gray scale correction curve to perform, using a gray scale corrector, gray scale correction on the gray scale components of the image signal for each color component,
wherein for each color component, the calculation of the maximum and the minimum includes:
calculating, as a first maximum, a class at which an accumulated value exceeds a predetermined proportion of a total frequency of the gray scale histogram, the accumulated value being obtained by accumulating the frequencies from a maximum class toward a minimum class in the gray scale histogram;

calculating, as a first minimum, a class at which an accumulated value exceeds a predetermined proportion of the total frequency of the gray scale histogram, the accumulated value being obtained by accumulating the frequencies from the minimum class toward the maximum class in the gray scale histogram;

comparing the absolute difference values in the absolute difference value histogram with a predetermined threshold value to obtain a minimum of classes having an absolute difference value exceeding the threshold value as a second minimum and a maximum of the classes having an absolute difference value exceeding the threshold value as a second maximum;

determining, as the minimum of the classes, a smaller of the first minimum and the second minimum; and determining, as the maximum of the classes, a larger of the first maximum and the second maximum.

* * * * *